United States Patent
Chittimalli et al.

(10) Patent No.: US 11,048,881 B2
(45) Date of Patent: Jun. 29, 2021

(54) METHOD AND SYSTEM FOR IDENTIFICATION OF RELATION AMONG RULE INTENTS FROM A DOCUMENT

(71) Applicant: Tata Consultancy Services Limited, Mumbai (IN)

(72) Inventors: Pavan Kumar Chittimalli, Pune (IN); Ravindra Naik, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 146 days.

(21) Appl. No.: 16/271,631

(22) Filed: Feb. 8, 2019

(65) Prior Publication Data
US 2019/0251170 A1 Aug. 15, 2019

(30) Foreign Application Priority Data
Feb. 9, 2018 (IN) .............................. 201821005067

(51) Int. Cl.
| G06F 40/30 | (2020.01) |
| G06N 5/02 | (2006.01) |
| G06F 40/35 | (2020.01) |
| G06F 40/289 | (2020.01) |

(52) U.S. Cl.
CPC ............ G06F 40/30 (2020.01); G06F 40/289 (2020.01); G06F 40/35 (2020.01); G06N 5/025 (2013.01)

(58) Field of Classification Search
CPC ...................... G06N 5/025; G06F 40/00–40/58
See application file for complete search history.

(56) References Cited

U.S. PATENT DOCUMENTS

| 2014/0195473 A1* | 7/2014 | Citeau ................... G06N 5/022 706/47 |
| 2017/0075904 A1 | 3/2017 | Hedges |
| 2018/0039695 A1* | 2/2018 | Chalabi ................. G06N 5/022 |

(Continued)

FOREIGN PATENT DOCUMENTS

KR 101246101 3/2013

OTHER PUBLICATIONS

Moro, A. et al. "Semantic Rule Filtering for Web-Scale Relation Extraction," $12^{th}$ *International Semantic Web Conference, Proceedings*, Sydney, NSW, Australia, Oct. 21-25, 2013; pp. 347-362.

(Continued)

*Primary Examiner* — Abul K Azad
(74) *Attorney, Agent, or Firm* — Finnegan, Henderson, Farabow, Garrett & Dunner, LLP

(57) ABSTRACT

A method and a system for mining rule intents from documents is provided, wherein the rule intents are basic atomic facts present in a sentence. The proposed method and system for identification of relation among rule intents from a document is performed in multiple stages that include identification and optimization of a pair-wise relation graph from rule intents based on a plurality of relation optimizing heuristic rules. The relations identified among the rule intents are displayed in Semantics of Business Vocabulary and Rules (SBVR) format, which can be easily analyzed by machines as SBVR is a comprehensive standard for business rule representation by Object Management Group (OMG) in accordance with set of a standard pre-defined vocabularies.

10 Claims, 11 Drawing Sheets

(56) References Cited

U.S. PATENT DOCUMENTS

2018/0082183 A1* 3/2018 Hertz .................. G06F 16/9024
2018/0315141 A1* 11/2018 Hunn ...................... G06F 40/42

OTHER PUBLICATIONS

Oramas, S. et al. "A Rule-Based Approach to Extracting Relations from Music Tidbits," *Proceedings of the 24$^{th}$ International Conference on World Wide Web*, Florence, Italy, May 18-22, 2015; 6 pages.
Peng, Y. et al. "An extended dependency graph for relation extraction in biomedical texts," *Proceedings of BioNLP 2015*, Beijing, China, Jul. 30, 2015.

* cited by examiner

METHOD AND SYSTEM FOR IDENTIFICATION OF RELATION AMONG RULE INTENTS FROM A DOCUMENT

CROSS-REFERENCE TO RELATED APPLICATIONS AND PRIORITY

The present application claims priority from Indian provisional specification no. 201821005067 filed on 9 Feb. 2018, the complete disclosure of which in its entirety is herein incorporated by references.

TECHNICAL FIELD

The disclosure herein generally relates to field of data mining and, more particularly, identification of relation among extracted rule intents from a document to finally represent them in a standard notation.

BACKGROUND

Rules are guidelines for carrying out processes or functions in any organization. The rules for the organization are created or designed by business analysts according to the needs of business of the organization by considering various constrains, regulations and policy guidelines as defined by the organization and government authorities. The rules are documented in natural language and are available as manuals, user guides, requirements documents, terms and conditions and so on. The data in natural language is unstructured and a structured representation of the same is critical for better understanding automation of decision systems.

Since the rules are backbone of organization to provide various services, they must be extracted from the unstructured natural language documents and converted to structured language, which are then easy to comprehend and analyze for inconsistencies. The process of manual extraction can be tedious due to size and structure of the documents. Further if the extracted rules are not in a structured representation machines may not be able to perform analysis and comprehension task.

The existing extraction or text mining techniques focuses on predictive classification or populating a database or search index with extracted information. These techniques focus on specific kind or class of documents and take advantage of the structure and format of the document, by using a predefined template. However issues such as eliminating noise, identifying rule sentences in the structured/unstructured documents, extracting rule intents from sentences, extracting relationship among the rule intents and creating their formal representations largely remain unsolved.

SUMMARY

Embodiments of the present disclosure present technological improvements as solutions to one or more of the above-mentioned technical problems recognized by the inventors in conventional systems. The embodiments herein provide a method and system for identification of relation among rule intents from a document. The proposed method and system for identification of relation among rule intents from a document is performed in multiple stages that include identification and optimization of a pair-wise relation graph from rule intents based on a plurality of relation optimizing heuristic rules. The relations identified among the rule intents are displayed in Semantics of Business Vocabulary and Rules (SBVR) format, which can be easily analyzed by machines as SBVR is a comprehensive standard for business rule representation by Object Management Group (OMG) in accordance with set of a standard pre-defined vocabularies.

In another aspect, a method for identification of relation among rule intents from a document is provided. The method includes extracting a plurality of sentences from the documents as an input, wherein the documents comprises of the plurality of input sentences are structured or unstructured documents that is written in natural language and contains noise. Further the method includes mining rule intents from the extracted plurality of rule sentences, wherein the rule intents which are basic atomic facts present in a sentence are mined from extracted rule sentences based on a plurality of rule intent mining heuristic rules and are saved as vocabularies in the Semantics of Business Vocabulary and Rules (SBVR) format. Furthermore the method includes identifying pair-wise relations between the mined rule intents using a trained classifier, wherein the classifier is trained and tested to identify pair-wise relations based on matching and feature extraction of annotated extracted rule intents and relation pairs. Further the method includes the step of extracting a plurality of pairwise relations that include and, or, argument, implication and null using the trained classifier. Furthermore the method includes creating a plurality of graphs based on the mined rule intents and the extracted pair-wise relations, wherein the graph is created using extracted pair-wise relations as edges and rule intents as nodes optimizing the created plurality of graphs individually to result in a single node based on a plurality of relation optimizing heuristic rules that includes pruning and merging of nodes and edges the graph based on plurality of heuristic rules is performed in several stages that include optimization of an amod node, a satellite node and a triangle node. Finally the method includes displaying the single node in a Semantics of Business Vocabulary and Rules (SBVR) format, wherein the single node represents relation among the rule intents.

In another aspect, a system for identification of relation among rule intents from a document is provided. The system comprises a memory storing instructions and a centralized database, one or more communication interfaces; and one or more hardware processors coupled to the memory via the one or more communication interfaces, wherein the one or more hardware processors are configured by instructions for extracting a plurality of sentences from the documents as an input. Further the system comprises of a rule intent mining unit for mining rule intents from the extracted plurality of rule sentences. Furthermore the system comprises of a rule-base database for saving mined rule intents as vocabularies in the Semantics of Business Vocabulary and Rules (SBVR) format. Further the system comprises of a classifier for identifying pair-wise relations between the mined rule intents. Furthermore the system comprises of a graph creation unit for creating a plurality of graphs based on the mined rule intents and the identified pair-wise relations. Further the system comprises of a relation optimizer for optimizing the created plurality of graphs individually to result in a single node based on a plurality of relation optimizing heuristic rules and finally the system comprises of a display module for displaying the single node in a Semantics of Business Vocabulary and Rules (SBVR) format.

In yet another aspect, there is provided one or more non-transitory machine readable information storage mediums comprising one or more instructions which when executed by one or more hardware processors causes the one or more hardware processors to perform identification of relation among rule intents from a document. The program includes extracting a plurality of sentences from the documents as an input, wherein the documents comprises of the plurality of input sentences are structured or unstructured documents that is written in natural language and contains noise. Further the program includes mining rule intents from the extracted plurality of rule sentences, wherein the rule intents which are basic atomic facts present in a sentence are mined from extracted rule sentences based on a plurality of rule intent mining heuristic rules and are saved as vocabularies in the Semantics of Business Vocabulary and Rules (SBVR) format. Furthermore the program includes identifying pair-wise relations between the mined rule intents using a trained classifier, wherein the classifier is trained and tested to identify pair-wise relations based on matching and feature extraction of annotated extracted rule intents and relation pairs. Further the program includes the step of extracting a plurality of pairwise relations that include and, or, argument, implication and null using the trained classifier. Furthermore the program includes creating a plurality of graphs based on the mined rule intents and the identified pair-wise relations, wherein the graph is created using extracted pair-wise relations as edges and rule intents as nodes optimizing the created plurality of graphs individually to result in a single node based on a plurality of relation optimizing heuristic rules that includes pruning and merging of nodes and edges the graph based on plurality of heuristic rules is performed in several stages that include optimization of an amod node, a satellite node and a triangle node. Finally the program includes displaying the single node in a Semantics of Business Vocabulary and Rules (SBVR) format, wherein the single node represents relation among the rule intents.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
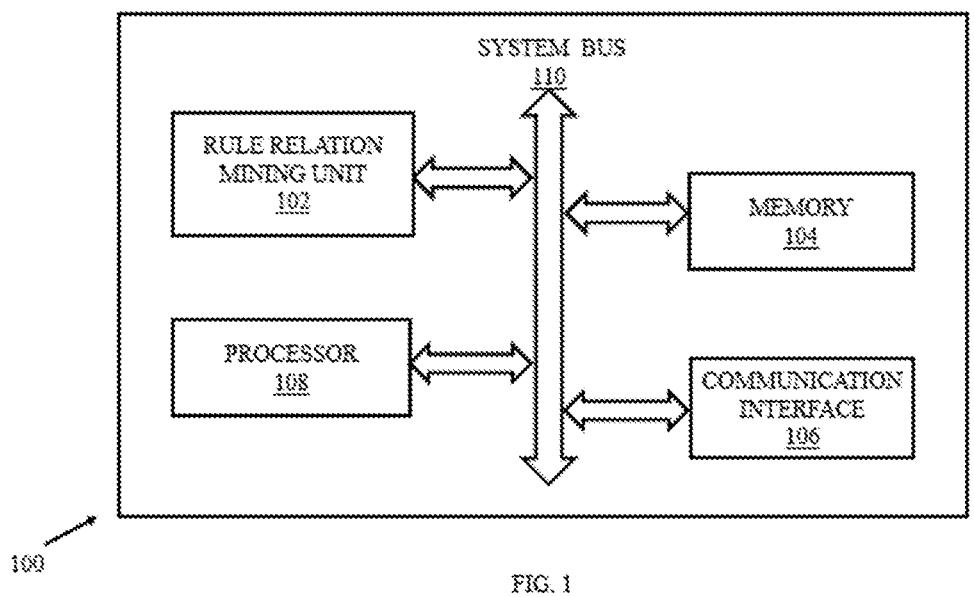
FIG. 1 illustrates an overview of an exemplary system for identification of relation among rule intents from a document, according to an embodiment of present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system for identification of relation among rule intents from a document. The proposed method and system for identification of relation among rule intents from a document is performed in multiple stages that include identification and optimization of a pair-wise relation graph from rule intents based on a plurality of relation optimizing heuristic rules. The relations identified among the rule intents are displayed in Semantics of Business Vocabulary and Rules (SBVR) format, which can be easily analyzed by machines as SBVR is a comprehensive standard for business rule representation by Object Management Group (OMG) in accordance with set of a standard pre-defined vocabularies.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

FIG. 1 is a block diagram of a system 100 for identification of relation among rule intents from a document, in accordance with an example embodiment. The system 100 includes a rule relation mining unit 102 for mining rule intents from documents. The rule relation mining unit 102 includes or is otherwise in communication with a memory 104, a communication interface 106, and a processor 108. The memory 104, communication interface 106, and the processor 108 may be coupled by a system bus 110 or a similar mechanism. Although FIG. 1 shows example components of rule relation mining unit 102, in other implementations, system 100 may contain fewer components, additional components, different components, or differently arranged components than depicted in FIG. 1.

The processor 108 may be implemented as one or more microprocessors, microcomputers, microcontrollers, digital signal processors, central processing units, state machines, logic circuitries, and/or any devices that facilitates in designing polymeric carrier for controlled release of molecules. Further, the processor 108 may comprise a multi-core architecture. Among other capabilities, the processor 108 is configured to fetch and execute computer-readable instructions or modules stored in the memory 104. The processor 108 may include circuitry implementing, among others, audio and logic functions associated with the communication. For example, the processor 106 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 108 thus may also include the functionality to encode messages and/or data or information. The processor 106 may include, among other things, a clock, an arithmetic logic unit (ALU) and logic gates configured to support operation of the processor 106. Further, the processor 106 may include functionality to execute one or more software programs, which may be stored in the memory 104 or otherwise accessible to the processor 108.

The memory 104, may store any number of pieces of information, and data, used by the system 100 to implement the functions of the system 100. The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Examples of volatile memory may include, but are not limited to volatile random access memory (RAM). The non-volatile memory may additionally or alternatively comprise an electrically erasable programmable read only memory (EEPROM), flash memory, hard drive, or the like. The memory 104 may be configured to store information, data, applications, instructions or the like for enabling the system 100 to carry out various functions in accordance with various example embodiments. Additionally or alternatively, the memory 104 may be configured to store instructions which when executed by the processor 108 causes the system 100 to behave in a manner as described in various embodiments.

The communication interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the communication interface (s) 108 may include one or more ports. One or more functionalities of the system 100 and components thereof, is further explained in detail with respect to block diagram described in FIG. 2.

Figure 2:
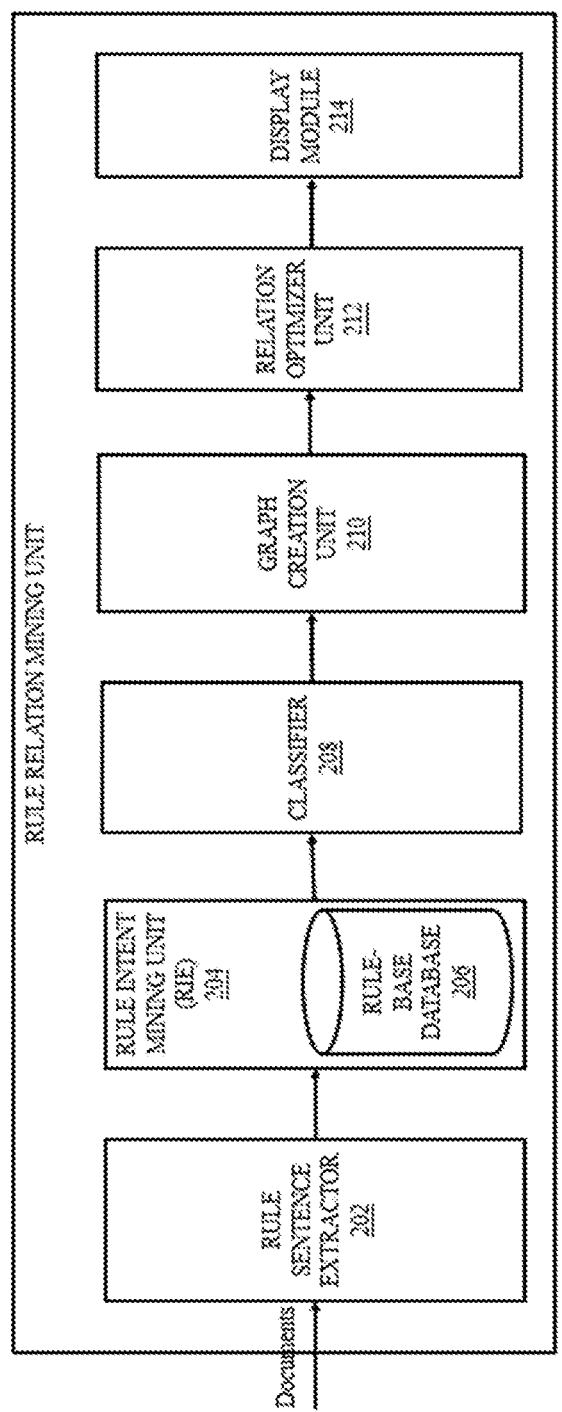
FIG. 2 is a functional block diagram of various modules stored in rule relation mining unit 102 of the system of FIG. 1 in accordance with some embodiments of the present disclosure.

FIG. 2, with reference to FIG. 1, is a functional block diagram of the rule relation mining unit 108 of the system 100 of FIG. 1 in accordance with an embodiment of the present disclosure. In an embodiment of the present disclosure, the rule relation mining unit 102 comprises of various modules that include a rule sentence extractor 202 for extracting a plurality of sentences from the documents as an input, a rule intent mining unit 204 for mining rule intents from the extracted plurality of rule sentences, a rule-base database 206 for saving mined rule intents as vocabularies in the Semantics of Business Vocabulary and Rules (SBVR) format, a classifier 208 for identifying pair-wise relations between the mined rule intents, a graph creation unit 210 for creating a plurality of graphs based on the mined rule intents and the extracted pair-wise relations, a relation optimizer 212 for optimizing the created plurality of graphs individually to result in a single node based on a plurality of relation optimizing heuristic rules and a display module 214 for displaying the single node in a Semantics of Business Vocabulary and Rules (SBVR) format.

According to an embodiment of the disclosure, the rule relation mining unit 102 within system 100 further comprises the rule sentence extractor 202 that is configured for extracting a plurality of sentences from the documents as an input. The input documents can be structured or unstructured, written in natural language and comprise of plurality of input sentences along with noise components. The plurality of input sentences in the received input documents are processed to extract plurality of rule sentence by segregating rule sentence from noise based on learning models across different domains, wherein based on the domain of the input document, the corresponding learning model is applied to extract plurality of rule sentence. Further each domain specific learning model is trained on multiple language models that include rule sentence training and noise sentence training based on known techniques that include trigram language model.

According to an embodiment of the disclosure, the rule relation mining unit 102 within system 100 further comprises the rule intent mining unit 204 that is configured for mining rule intents (RI) from the extracted plurality of rule sentences, wherein the rule intents are basic atomic facts present in a sentence. The rule intents can be mined or extracted based on techniques that are known in art, such as heuristic rules proposed in U.S. Non-Provisional Patent Application No. 62/625,703, filed on Feb. 2, 2018. The proposed method and system for mining of rule intents from documents in the U.S. Non-Provisional Patent Application No. 62/625,703 is performed in multiple stages that include analyzing dependency trees of plurality sentences of input documents based on a set of plurality of heuristic rules. The mined rule intents are further saved as vocabularies in the Semantics of Business Vocabulary and Rules (SBVR) format in a rule-base database 206.

According to an embodiment of the disclosure, the rule relation mining unit 102 within system 100 further comprises the classifier 208 that is configured for identifying pair-wise relations between the mined rule intents. A plurality of pairwise relations are identified that include and ($\wedge$), or ($\vee$), argument ($RI_1$ ($RI_2$)), implication ($\rightarrow$) and null (NULL) using the trained classifier. The classifier is trained and tested to identify pair-wise relations based on matching and feature extraction of annotated extracted rule intents and relation pairs. In an embodiment, considering a use case example of a maximum-entropy (max-Ent) classifier for identifying pair-wise relations between the mined rule intents, wherein the max-Ent classifier is trained in multiple stages and further tested. The training phase includes annotation of rule intents, followed by storing the annotated data in a standard model/format such as XML Metadata Interchange (XMI) and finally matching and extracting the features. During the training phase, the Max-Ent classifier is trained with few of several features as listed below;
  1. Head Word.
  2. Postag.

3. Edge sequence of dependency tree.
4. Positional difference.
5. Child-parent relation between head words.
6. Child by which edge
7. Predecessor successor
8. Sibling
9. Sibling with same edge
10. Is a common word being shared as argument with same role
11. Is a common word being shared as argument with different role.
12. Is headword and argument same.
13. Is headword and argument same.
14. Intersection of headword and arguments of different rule intents.
15. Intersection of headword and arguments of different rule intents.
16. Does rule intent with \is"
17. Postag sequence from one head word to another.
18. Number of arguments in each rule intents
19. Postag group of headword1 and headword2.
20. Level difference between headwords
21. Postag of parent of each headword.

The Max-Ent classifier extracts the rule intents and annotates the data for the relation. Considering a use case example of rule text $rs_1$ as shown below;

$rs_1$ is "No account is opened in anonymous or fictitious name."

During the classification process, the rule text $rs_1$ is first annotated. Each annotation consists of two extracted Rule Intent (RI) s and the relation between them. Each of components are separated by '_'. Each RI part consists of three parts separated by '#', as shown below;

of rule intent is checked for same pair in annotations and the rule intents are matched by matching headwords, index and list of arguments. Furthermore, feature string is created by extracting the feature for each pair of rule intent. Further, the retrieved relation is appended from the annotation to corresponding string. Further, the extracted feature string are saved (as a file with .f extension) for which an use case example is shown below;

childByEdge_prepchildParent_yescommonWordArgument_yes
edgeSeq_h2_prepin_h1h1_nameh1Arg2Intersect_h1h1arg1Same_yes
h2_openedlevelDiff_1noArg1_1noArg2_2
parentTag1_VBNparentTag2_rootpos1_NNpos2_VBNposDiff_5  posDiffBin_2posDiffSign_+
posGrp1_NNposGrp2_VB  posTagSeq_VBN_IN_JJ_CC_JJ_NNpredecessor_
h2r1is_yes successor_h1IMP Further during the testing phase, a sample rule text is given to the trained Max-Ent classifier. The rule intents, and the relation is extracted. Unlike training feature strings are not appended with the relation label. Feature strings for testing are appended with a '?' and an use case example is as shown below;

Forcontext: childBy Edge$_p$repchildParent$_y$es commonWordArgument$_y$esedgeSeq$_h$2$_p$repin$_h$1h1$_n$ame h1Arg2Intersect$_h$1h1arg1Same$_y$esh2$_o$penedlevelDiff$_1$ noArg1$_1$noArg2$_2$parentTag1$_V$BNparentTag2$_r$ootpos1 NNpos2$_V$BN  posDiff$_5$posDiffBin$_2$posDiffSign$_+$ posGrp1$_N$NposGrp2$_V$B
posTagSeq$_V$BN$_1$N$_J$C$_J$N$_N$Npredecessor$_h$2r1is$_y$, essuccessor$_h$1?
NULL[0.0001]AND[0.0306]IMP[0.9692]OR[0.0001]

| Rule Sentence | Rule Intents |
|---|---|
| ($ri_1 \lor ri_2$) | isAnonymous(name{property})#9#name_OR_isFictitious(name{property})#9#name |
| ($ri_1 \Rightarrow ri_2$) | isAnonymous(name{property})#9#name_IMP_doOpen(in name{Pobject}, account{object})#4#opened |
| ($ri_1 \Rightarrow ri_2$) | isFictitious(name{property})#9#name_IMP_doOpen(in name{Pobject}, account{object})#4#opened |

Figure 10:
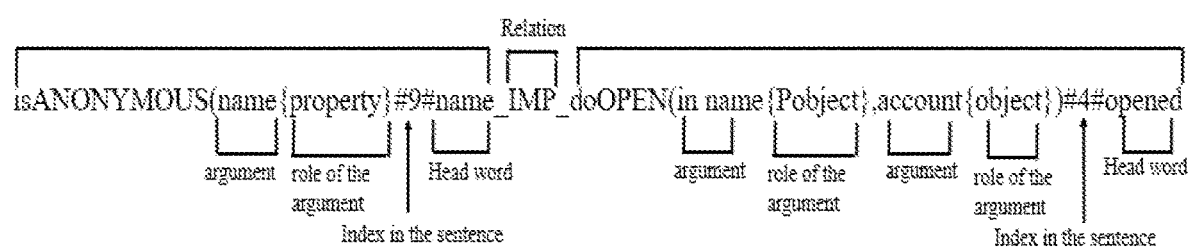
FIG. 10 illustrates training annotation of the data for relations, in accordance with some embodiments of the present disclosure.

Considering an example of $ri_1 \Rightarrow ri_3$ from the table above, the training annotation can also be expressed as shown in FIG. 10.

The three parts of the $ri_1 \Rightarrow ri_3$ are explained below:
a. RI in string format—Note in this form each argument is also annotated with its role in the RI. For example the in the RI 'isAnonymous(namefpropertyg)' the string 'fpropertyg' adjacent to the argument word 'name' indicate that the role of the argument in the RI is 'property'.
b. Position of the headword in the sentence.
c. Headword.

Figure 4:
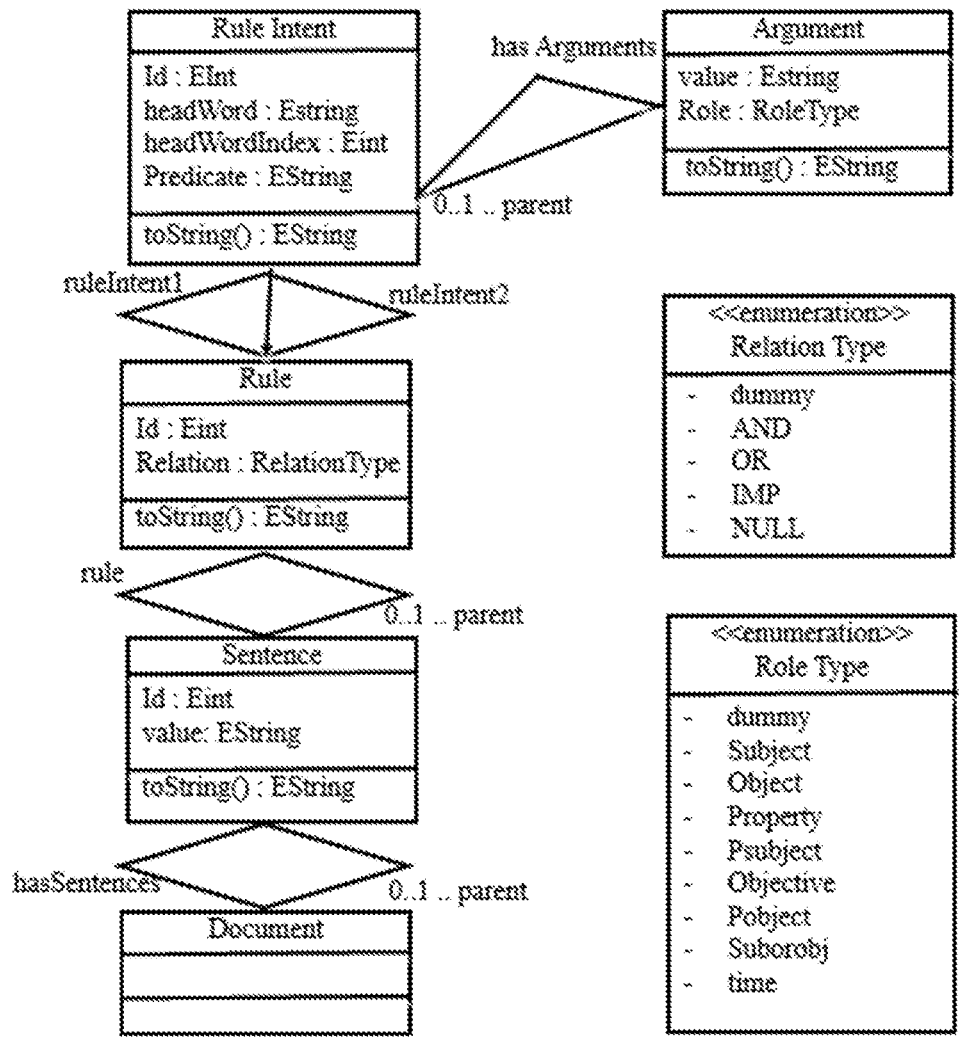
FIG. 4 illustrate use case examples, wherein an XML Metadata Interchange (XMI) model of identified pair-wise relations of rule intents is displayed, in accordance with some embodiments of the present disclosure.

Further the trained annotations which are saved in a excel file are read from the excel file, parsed and data is stored as model in XMI format (saved with .xmi extension) as shown in FIG. 4.

Figure 5:
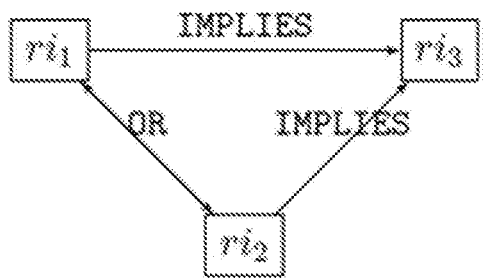
FIG. 5 illustrate use case examples, wherein rule relation graph of identified pair-wise relations of rule intents is displayed, in accordance with some embodiments of the present disclosure.

Further the annoted text saved in XMI format is iteratively matched and relation feature is extracted. The proposed matching and feature extraction is iteratively performed in several stages that include reading, paring and creation of feature string from annoted text saved in XMI format. During the first stage, annoted text saved in XMI format is read and rule intents are extracted. Further, a pair According to an embodiment of the disclosure, the rule relation mining unit 101 within system 100 further comprises the graph creation unit 210 that is configured for creating a plurality of graphs based on the mined rule intents and the pair-wise relations identified using the classifier 208. The graph is created by making extracted pair-wise relations as edges and rule intents as nodes. The graph created may consist of more than one rule intent and plurality of relation among the identified rule intent. In accordance with some embodiments of the present disclosure, FIG. 5 illustrates use case examples, wherein rule relation graph of identified pair-wise relations of rule intents is displayed, wherein pair-wise relations such as OR, IMPLIES are shown as edges and the rule intents ($ri_1$, $ri_2$, $ri_3$) as nodes.

According to an embodiment of the disclosure, the rule relation mining unit 102 within system 100 further comprises the relation optimizer 212 that is configured for optimizing the created plurality of graphs individually to result in a single node based on a plurality of relation optimizing heuristic rules. The graph created in the graph creation unit 210 may consist of more than one rule intent and plurality of relation among the identified rule intent, which would be optimized to result in a single node in the relation optimizer 212. In an embodiment, the proposed optimization which includes pruning and merging of nodes and edges the graph is based on plurality of heuristic rules is performed in several stages that include optimization of a amod node, a satellite node and a triangle node, wherein the amod node is an argument pair-wise relation node, the satellite node is a node of the graph that has only one neighbor and the triangle node is a node of the graph that has three neighbors. The proposed optimization results in a single node, wherein the single node represents relation among the rule intents.

Figure 6:
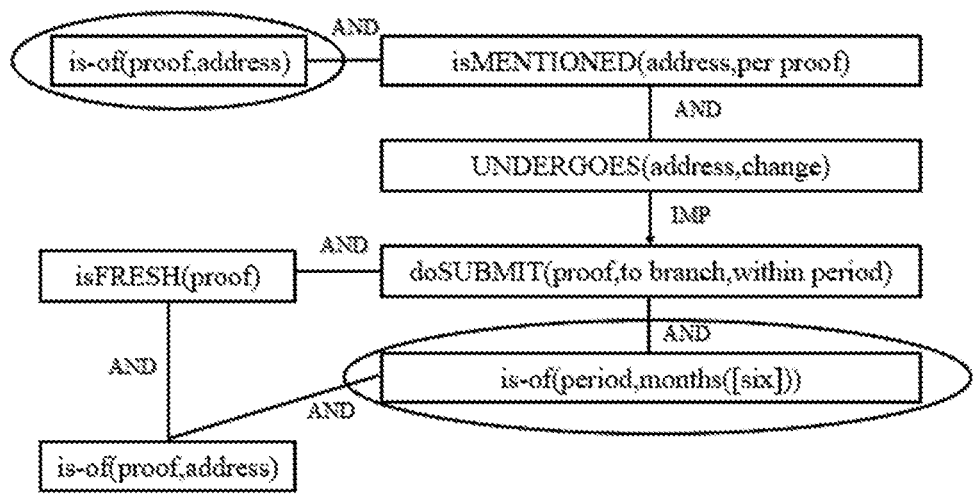
FIG. 6 illustrate use case examples, wherein satellite rule relation graph of identified pair-wise relations of rule intents is displayed, in accordance with some embodiments of the present disclosure.

Satellite node are nodes which have only one neighbor hence satellite nodes are merged to their neighbor node in multiple stages that include create a new node, wherein the new node consists of both the RIs and the relation between them. Further all the edges of old RI nodes are copied to the new RI node, however the edge that exist between the new RI node are not copied but deleted, hence resulting in merging of all the nodes. In an embodiment, considering an use case example of a rule sentence as "In case the address mentioned as per 'proof of address' undergoes a change, fresh proof of address may be submitted to the branch within a period of six months", the satellite nodes of the graph are illustrated in FIG. 6 and the optimized graph for satellite nodes are as shown in FIG. 7A and FIG. 7B.

Figure 7A:
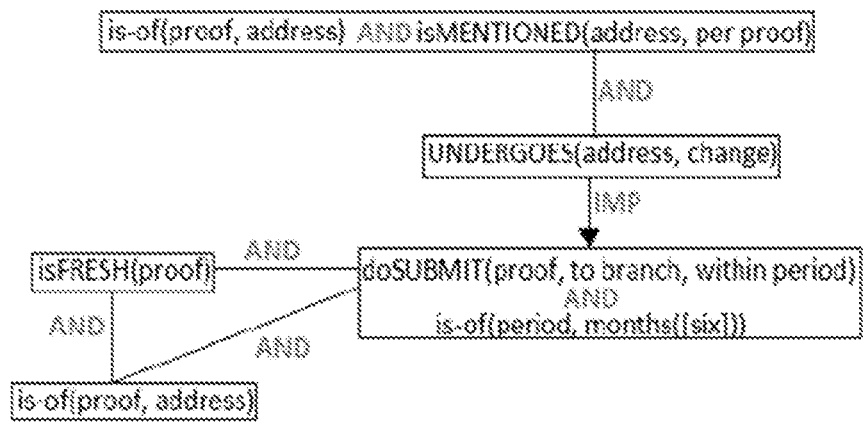
FIG. 7A and FIG. 7B illustrate use case examples of optimized satellite rule relation graph of identified pair-wise relations of rule intents is displayed, in accordance with some embodiments of the present disclosure FIG. 8 illustrate use case examples, wherein rule relation graph of a triangular resolve is displayed, in accordance with some embodiments of the present disclosure.
Figure 7B:
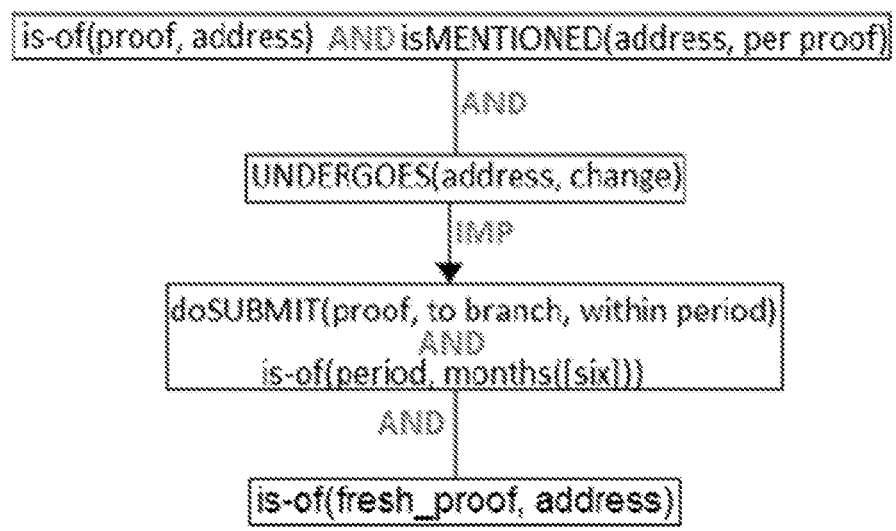
Figure 8:
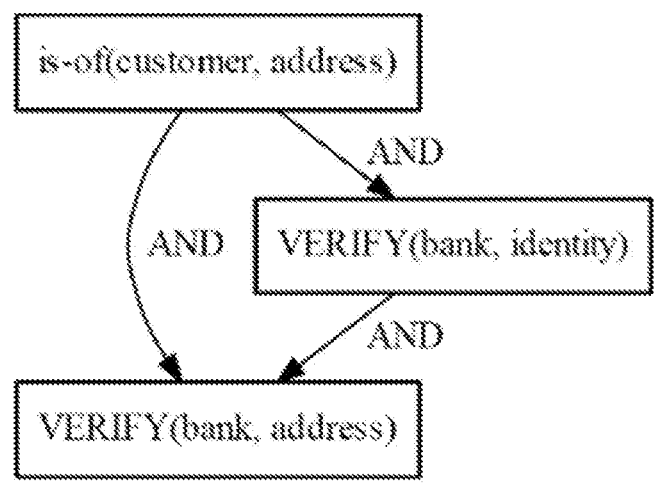
Figure 9:
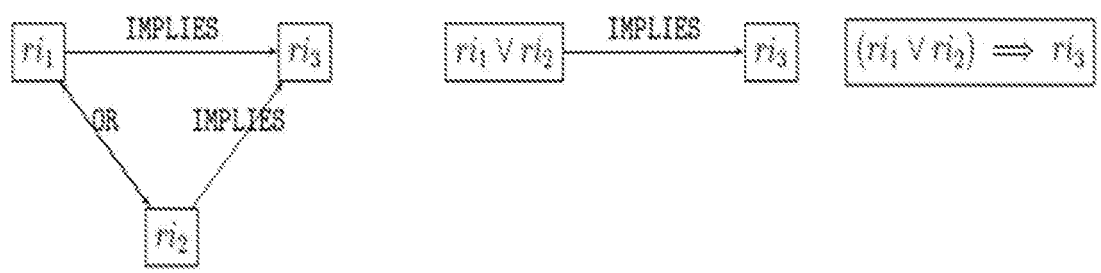
FIG. 9 illustrate use case examples, wherein triangular resolve of rule relation graph (with argument pair-wise relation) are displayed, in accordance with some embodiments of the present disclosure.

Further, after merging and pruning satellite nodes, argument pair-wise relation node (amod) and implication is optimized as shown in FIG. 7A, FIG. 7B and FIG. 9, wherein nodes are reduced and graph is optimized. Finally the triangle node is optimized wherein, a triangular node is a node of the graph that has three neighbors as shown in FIG. 8. A triangular node may have similar or same edges (same pair-wise relation) as shown in FIG. 8 or dissimilar edges as shown in FIG. 5 and FIG. 9. In case of similar edges the edges can be merged in any order, however in case of dissimilar edges, the dissimilar edge is merged first and then the merged dissimilar edge is merged with similar edge as shown in FIG. 9, wherein the OR edge is merged first to result in $ri_1 \lor ri_2$ and then this merged dissimilar edge is merged again with the similar edge to result in a single node of $(ri_1 \lor ri_2) \rightarrow ri_3$.

According to an embodiment of the disclosure, the rule relation mining unit 102 within system 100 further comprises the display module 214 that is configured for displaying the single node in a Semantics of Business Vocabulary and Rules (SBVR) format, wherein the single node represents relation among the rule intents. The mined rule intents & relation between them are displayed automatically in the SBVR format by using known techniques such as Simple Natural Language Generation (SimpleNLG), so that the displayed mined rule intents & relation can be easily analyzed as they SBVR is a comprehensive standard for business rule representation by Object Management Group (OMG) in accordance with set of a standard pre-defined vocabularies.

Figure 3:
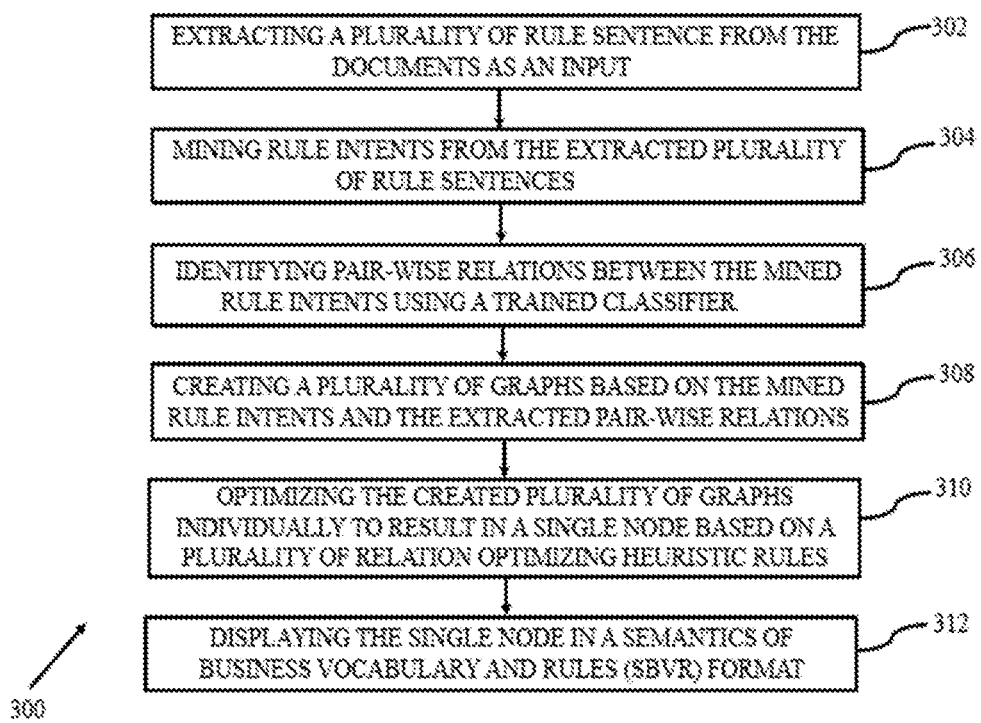
FIG. 3 a flow diagram illustrating a method for identification of relation among rule intents from a document, according to an embodiment of present disclosure.

FIG. 3, with reference to FIGS. 1-2, is an exemplary flow diagram 300 illustrating a method for identification of relation among rule intents from a document using the system 100 of FIG. 1 according to an embodiment of the present disclosure. In an embodiment, the system 100 comprises one or more data storage devices or the memory 104 operatively coupled to the one or more processors 108 and is configured to store instructions for execution of steps of the method by the rule relation mining unit 102. The steps of the method of the present disclosure will now be explained with reference to the components of the system 100 and the modules 202-214 as depicted in FIGS. 1-2, and the flow diagram as depicted in FIG. 3.

At step 302, extracting a plurality of rule sentence from the documents as an input to the rule sentence extractor (202). The input documents can be structured or unstructured, written in natural language and comprises of plurality of input sentences along with noise components. The plurality of input sentences in the received input documents are processed to extract plurality of rule sentence by segregating rule sentence from noise based on learning models across different domains.

At step 304, rule intents are mined from the extracted plurality of rule sentences in the rule intent mining unit 204. The rule intents which are basic atomic facts present in a sentence can be mined or extracted based on techniques that are known in art, such as heuristic rules proposed in U.S. Non-Provisional Patent Application No. 62/625,703, filed on Feb. 2, 2018. The mined rule intents are further saved as vocabularies in the Semantics of Business Vocabulary and Rules (SBVR) format in a rule-base database 206.

At step 306, pair-wise relations are identified between the mined rule intents using a trained classifier 208. The classifier is trained to identify pair-wise relations based on matching and feature extraction of annotated extracted rule intents and relation pairs. A plurality of pairwise relations are identified that include and, or, argument, implication and null using the trained classifier.

At step 308, a plurality of graphs are created based on the mined rule intents and the identified pair-wise relations in the graph creation unit 210. The graph is created using extracted pair-wise relations as edges and rule intents as nodes.

At step 310, the created plurality of graphs are optimized individually to result in a single node based on a plurality of relation optimizing heuristic rules in the relation optimizer 212. The comprising optimization includes pruning and merging of nodes and edges the graph based on plurality of heuristic rules is performed in several stages that include optimization of a amod node, a satellite node and a triangle node, wherein the amod node is an argument pair-wise relation node, the satellite node is a node of the graph that has only one neighbor and the triangle node is a node of the graph that has three neighbors. The proposed optimization results in a single node, wherein the single node represents relation among the rule intents.

At step 312, the identified single node is displayed in the display module 214 as relation between rule intents in Semantics of Business Vocabulary and Rules (SBVR) by using known techniques such as Simple Natural Language Generation (SimpleNLG), so that the displayed mined rule intents & relation can be easily analyzed as they SBVR is a comprehensive standard for business rule representation by Object Management Group (OMG) in accordance with set of a standard pre-defined vocabularies.

The illustrated steps of method 300 are set out to explain the exemplary embodiments shown, and it should be anticipated that ongoing technological development may change the manner in which particular functions are performed. These examples are presented herein for purposes of illustration, and not limitation.

Hence a method and a system for mining rule intents from documents is provided, wherein the rule intents are basic atomic facts present in a sentence. The proposed method and system for identification of relation among rule intents from a document is performed in multiple stages that include extraction and optimization of a pair-wise relation graph from rule intents based on a plurality of relation optimizing heuristic rules. The relations identified among the rule intents are displayed in Semantics of Business Vocabulary and Rules (SBVR) format, which can be easily analyzed by machines as SBVR is a comprehensive standard for business rule representation by Object Management Group (OMG) in accordance with set of a standard pre-defined vocabularies.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims

We claim:

1. A processor-implemented method for identification of relation among rule intents from a document, the method comprising:
   extracting a plurality of rule sentences from the documents as an input;
   mining rule intents from the extracted plurality of rule sentences;
   identifying pair-wise relations between the mined rule intents using a trained classifier;
   creating a plurality of graphs based on the mined rule intents and the identified pair-wise relations;
   optimizing the created plurality of graphs individually to result in a single node based on a plurality of relation optimizing heuristic rules, wherein optimization includes pruning and merging of nodes and edges the graph based on plurality of heuristic rules is performed in several stages that include optimization of a amod node, a satellite node and a triangle node, wherein the amod node is an argument pair-wise relation node, the satellite node is a node of the graph that has only one neighbor and the triangle node is a node of the graph that has three neighbors; and
   displaying the single node in a Semantics of Business Vocabulary and Rules (SBVR) format, wherein the single node represents relation among the rule intents.

2. The method of claim 1, wherein the documents comprises of the plurality of input sentences, the documents are structured or unstructured documents written in natural language and contains noise.

3. The method of claim 1, wherein the rule intents which are basic atomic facts present in a sentence are mined from extracted rule sentences based on a plurality of rule intent mining heuristic rules.

4. The method of claim 1, wherein the mined rule intents are saved as vocabularies in the Semantics of Business Vocabulary and Rules (SBVR) format.

5. The method of claim 1, wherein a classifier is trained and tested to identify pair-wise relations based on matching and feature extraction of annotated extracted rule intents and relation pairs.

6. The method of claim 1, further comprising the step of identifying a plurality of pairwise relations that include and, or, argument, implication and null using the trained classifier.

7. The method of claim 1, wherein the graph is created using extracted pair-wise relations as edges and rule intents as nodes.

8. A system comprising:
a rule relation mining unit (102) for mining rule intents from documents;
a memory (104) for storing instructions;
one or more communication interfaces (106);
one or more hardware processors (108) communicatively coupled to the memory using the one or more communication interfaces, wherein the one or more hardware processors are configured by the instructions to execute the one or more modules of the relation mining unit (102) comprising:
a rule sentence extractor (202) for extracting a plurality of sentences from the documents as an input;
a rule intent mining unit (204) for mining rule intents from the extracted plurality of rule sentences;
a classifier (208) for identifying pair-wise relations between the mined rule intents;
a graph creation unit (210) for creating a plurality of graphs based on the mined rule intents and the identified pair-wise relations;
a relation optimizer (212) for optimizing the created plurality of graphs individually to result in a single node based on a plurality of relation optimizing heuristic rules, wherein optimization includes pruning and merging of nodes and edges the graph based on plurality of heuristic rules is performed in several stages that include optimization of a amod node, a satellite node and a triangle node, wherein the amod node is an argument pair-wise relation node, the satellite node is a node of the graph that has only one neighbor and the triangle node is a node of the graph that has three neighbors; and
a display module (214) for displaying the single node in a Semantics of Business Vocabulary and Rules (SBVR) format, wherein the single node represents relation among the rule intents.

9. The system of claim 8, wherein the mined rule intents are saved as vocabularies in the Semantics of Business Vocabulary and Rules (SBVR) format in a rule-base database (206).

10. One or more non-transitory machine readable information storage mediums comprising one or more instructions which when executed by one or more hardware processors cause:
extracting a plurality of rule sentences from the documents as an input;
mining rule intents from the extracted plurality of rule sentences;
identifying pair-wise relations between the mined rule intents using a trained classifier;
creating a plurality of graphs based on the mined rule intents and the extracted pair-wise relations;
optimizing the created plurality of graphs individually to result in a single node based on a plurality of relation optimizing heuristic rules, wherein optimization includes pruning and merging of nodes and edges the graph based on plurality of heuristic rules is performed in several stages that include optimization of a amod node, a satellite node and a triangle node, wherein the amod node is an argument pair-wise relation node, the satellite node is a node of the graph that has only one neighbor and the triangle node is a node of the graph that has three neighbors; and
displaying the single node in a Semantics of Business Vocabulary and Rules (SBVR) format, wherein the single node represents relation among the rule intents.

* * * * *